L. T. & C. H. SMITH.
Harrow.
No. 234,928. Patented Nov. 30, 1880.
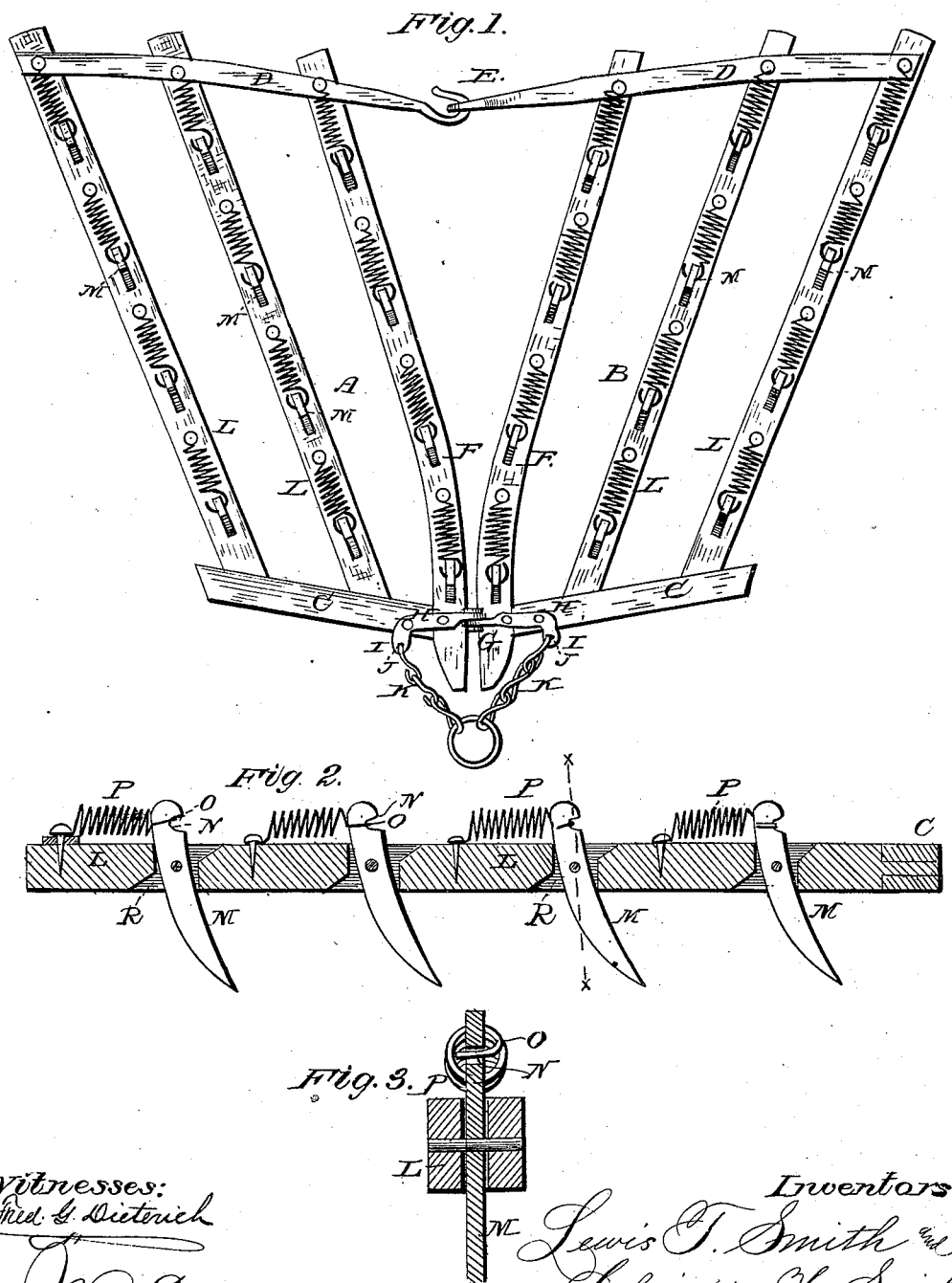

UNITED STATES PATENT OFFICE.

LEWIS T. SMITH AND CHRISTIAN H. SMITH, OF PLEASANT UNITY, PA.

HARROW.

SPECIFICATION forming part of Letters Patent No. 234,928, dated November 30, 1880.

Application filed November 12, 1879.

*To all whom it may concern:*

Be it known that we, LEWIS T. SMITH and CHRISTIAN H. SMITH, of Pleasant Unity, in the county of Westmoreland and State of Pennsylvania, have invented certain new and useful Improvements in Harrows; and we do hereby declare that the following is a full, clear, and exact description of the invention, which will enable others skilled in the art to which it appertains to make and use the same, reference being had to the accompanying drawings, which form a part of this specification.

Figure 1 is a top view. Fig. 2 is a longitudinal vertical sectional view through one of the frame-bars, and Fig. 3 is a cross-section on the line $x\,x$, Fig. 2.

Corresponding parts in the several figures are denoted by like letters of reference.

This invention relates to harrows; and it consists in certain improvements in the construction of the same, which will be hereinafter fully described, and particularly pointed out in the claim.

Our improved harrow consists of two sections, hinged together side by side, instead of, as is usually the case, one behind the other. The said sections A B consist each of several longitudinal bars, arranged diagonally right and left hand, respectively, as shown, and connected by the front bars, C C, into which the frame-bars are mortised, and by the rear braces, D D, which extend inwardly and are hooked together so as to form a hinge-joint, E.

The inner frame-bars, F F, are bent near their front ends and fitted closely together, the object being to brace the harrow-sections together, and thus insure strength and stability.

At their front ends the frame-bars are connected together by a hinge, G, the leaves of which, H H, are provided with lugs I I, having openings J J, for the attachment of a chain, K, to one of the links of which the draft may be attached. By this arrangement the draft may rapidly and easily be regulated, either evenly or with an excess upon either of the sides or sections of the harrow.

The frame-bars F L L are provided with longitudinal slots R, in which the harrow-teeth M M are pivoted, as shown. The teeth are curved in a forward direction, for the purpose of more readily breaking up the clods and pulverizing the soil, and at their upper ends they are provided with notches N, upon which are secured the loops O at the forward ends of coiled springs P, secured behind the individual harrow-teeth and forcing the points of the latter in a forward direction. By this arrangement stones and other obstructions may be passed over without breaking or injuring any of the teeth of our improved harrow.

By hinging the sections of the harrow side by side it will be observed that either section may be lifted and thrown out of operation without affecting the operation of the other section.

In all respects our improved harrow is simple, durable, and easily operated.

Having thus described our invention, we claim and desire to secure by Letters Patent of the United States—

In a harrow, the combination of the bars F L, having longitudinal slots R, with the pivoted teeth M, provided with spiral springs P, having loops O, and secured to said bars back of each tooth, as and for the purpose specified.

In testimony that we claim the foregoing as our own, we have hereto affixed our signatures in presence of two witnesses.

LEWIS T. SMITH.
CHRISTIAN H. SMITH.

Witnesses:
ROBERT ROSS,
JAMES P. GRAHAM.